(12) United States Patent
Guo

(10) Patent No.: US 12,739,798 B2
(45) Date of Patent: Sep. 15, 2026

(54) RESOURCE ALLOCATION METHOD AND APPARATUS THEREOF

(71) Applicant: Beijing Xiaomi Mobile Software Co., Ltd., Beijing (CN)

(72) Inventor: Shengxiang Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 336 days.

(21) Appl. No.: 18/572,874

(22) PCT Filed: Jun. 24, 2021

(86) PCT No.: PCT/CN2021/102201
§ 371 (c)(1),
(2) Date: Dec. 21, 2023

(87) PCT Pub. No.: WO2022/266963
PCT Pub. Date: Dec. 29, 2022

(65) Prior Publication Data
US 2024/0292384 A1 Aug. 29, 2024

(51) Int. Cl.
*H04W 72/044* (2023.01)
*H04L 27/26* (2006.01)
*H04W 72/51* (2023.01)

(52) U.S. Cl.
CPC ..... *H04W 72/044* (2013.01); *H04L 27/26025* (2021.01); *H04W 72/51* (2023.01)

(58) Field of Classification Search
CPC ... H04W 72/044; H04W 72/51; H04W 72/23; H04W 8/24; H04L 27/26025; H04L 5/0042; H04L 5/0044; H04L 5/0094
See application file for complete search history.

(56) References Cited

U.S. PATENT DOCUMENTS 9,398,589 B2 7/2016 Xu et al.
10,091,724 B2 10/2018 Li et al.
2013/0301533 A1 11/2013 Oteri et al.
2014/0153524 A1 6/2014 Xu et al.
2016/0073400 A1 3/2016 Sundberg et al.
(Continued)

FOREIGN PATENT DOCUMENTS

CA 3121404 A1 * 6/2020 ............ H04W 72/23
CN 102740486 A 10/2012
(Continued)

OTHER PUBLICATIONS

ISA State Intellectual Property Office of the People's Republic of China, International Search Report Issued in Application No. PCT/CN2021/102201, Mar. 21, 2022, WIPO, 4 pages.
(Continued)

*Primary Examiner* — Jay P Patel
(74) *Attorney, Agent, or Firm* — Volpe Koenig

(57) ABSTRACT

Resource allocation methods and apparatuses thereof are provided, which can be applied to the mobile communication technologies. The method includes: determining a maximum number of transmission resource blocks of a terminal device in combination with capability information reported by the terminal device, and configuring resource block for the terminal device in combination with the determined maximum number of transmission resource blocks.

13 Claims, 5 Drawing Sheets

(56) References Cited

U.S. PATENT DOCUMENTS

| | | | | |
|---|---|---|---|---|
| 2016/0142976 | A1 | 5/2016 | Li et al. | |
| 2018/0092080 | A1 | 3/2018 | Kim et al. | |
| 2020/0014508 | A1* | 1/2020 | Guo | H04L 5/001 |
| 2020/0084753 | A1 | 3/2020 | Li et al. | |
| 2020/0367050 | A1 | 11/2020 | Yang | |
| 2021/0152418 | A1* | 5/2021 | Abdelghaffar | H04B 7/0602 |
| 2021/0329574 | A1* | 10/2021 | Ang | H04W 48/12 |
| 2022/0030593 | A1* | 1/2022 | Yerramalli | H04W 72/23 |
| 2022/0394741 | A1* | 12/2022 | Jiang | H04W 72/1268 |
| 2023/0036057 | A1* | 2/2023 | Lei | H04L 27/2607 |
| 2023/0269730 | A1* | 8/2023 | Sun | H04L 5/0053 370/329 |
| 2023/0292149 | A1* | 9/2023 | Wu | H04W 24/02 |
| 2023/0309117 | A1* | 9/2023 | Sun | H04L 1/1861 |
| 2024/0155613 | A1* | 5/2024 | Mozaffari | H04L 5/0053 |

FOREIGN PATENT DOCUMENTS

| | | | | |
|---|---|---|---|---|
| CN | 103548402 | A | 1/2014 | |
| CN | 104144447 | A | 11/2014 | |
| CN | 107733553 | A | 2/2018 | |
| CN | 111010739 | A | 4/2020 | |
| CN | 112020140 | A | 12/2020 | |
| EP | 3454497 | B1 * | 5/2021 | H04L 5/003 |
| WO | WO-2019047773 | A1 * | 3/2019 | H04W 72/04 |

OTHER PUBLICATIONS

European Patent Office, Extended European Search Report Issued in Application No. 21946459.1, Jun. 11, 2024, Germany, 9 pages.

ISA State Intellectual Property Office of the People's Republic of China, Written Opinion of the International Searching Authority Issued in Application No. PCT/CN2021/102201, Mar. 21, 2022, WIPO, 7 pages.

Ericsson et al., "E-UTRA—NR resource allocation coordination over X2", R3-181570, 3GPP TSG-RAN WG3 Meeting #99, Athens, Greece, Feb. 26-Mar. 2, 2018, 18 pages.

Samsung, "Corrections on DL/UL Resource Allocation", R1-1806737, 3GPP TSG RAN WG1 Meeting #93, Busan, Korea, May 21-25, 2018, 3 pages.

* cited by examiner

RESOURCE ALLOCATION METHOD AND APPARATUS THEREOF

CROSS-REFERENCE TO RELATED APPLICATION

The present application is a U.S. National Stage of International Application No. PCT/CN2021/102201, filed on Jun. 24, 2021, the contents of which are incorporated herein by reference in their entirety for all purposes.

TECHNICAL FIELD

The present disclosure relates to the field of communication technologies, and in particular to resource allocation methods and apparatuses thereof.

BACKGROUND

In wireless communication technologies, such as a 4th Generation mobile information system or a 5th Generation mobile information system, in a process of resource block configuration in related technologies, if a channel bandwidth used by a terminal device is determined, a maximum resource block number used by a terminal device is also fixed, and the maximum resource block number allocated by a network device for the terminal device is fixed. However, for different terminal devices using a same channel bandwidth, corresponding maximum transmission resource block capabilities of different terminal devices are different. The method of configuring resource blocks based on the channel bandwidth used by the terminal device may lead to low spectrum utilization.

SUMMARY

Embodiments of the present disclosure provide resource allocation methods and apparatuses thereof.

In a first aspect, an embodiment of the present disclosure provides a resource allocation method, which is performed by network device, and the method includes: determining a maximum number of transmission resource blocks of a terminal device according to capability information reported by the terminal device; and configuring resource block information for the terminal device according to the maximum number of transmission resource blocks.

In a second aspect, an embodiment of the present disclosure provides another resource allocation method, which is performed by a terminal device in a designated area, and the method includes: reporting capability information to a network device, where the capability information is used for determining a maximum number of transmission resource blocks of the terminal device, and the maximum number of transmission resource blocks is used for configuring resource block information for the terminal device.

In a third aspect, an embodiment of the present disclosure provides a resource allocation apparatus, which includes a processor, and when the processor calls a computer program in a memory, the processor is configured to determine a maximum number of transmission resource blocks of a terminal device according to capability information reported by the terminal device; and configure resource block information for the terminal device according to the maximum number of transmission resource blocks.

BRIEF DESCRIPTION OF DRAWINGS

In order to more clearly illustrate the technical solutions in the embodiments or background of the present disclosure, the accompanying drawings to be used in the embodiments or background of the present disclosure will be described below.

FIG. 5 is a flowchart of another resource allocation method according to an embodiment of the present disclosure.

FIG. 6 is a flowchart of another resource allocation method according to an embodiment of the present disclosure.

DETAILED DESCRIPTION

In order to better understand a resource allocation method disclosed by embodiments of the present disclosure, a communication system to which the embodiments of the present disclosure apply will be described below.

Figure 1:
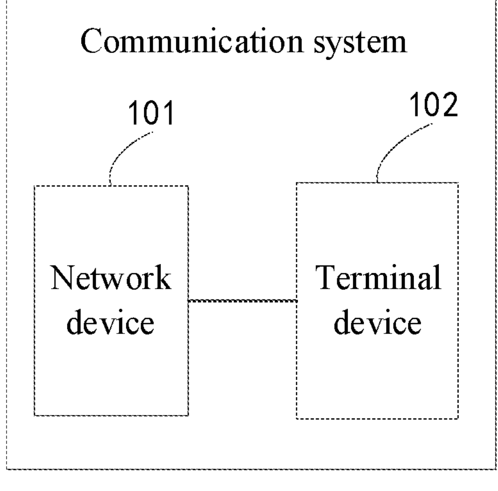
FIG. 1 is a schematic architectural diagram of a communication system according to an embodiment of the present disclosure.

Referring to FIG. 1, FIG. 1 is a schematic architectural diagram of a communication system according to an embodiment of the present disclosure. The communication system may include, but is not limited to, a network device and a terminal device. The number and form of devices shown in FIG. 1 are only for example and do not constitute a limitation to the embodiments of the present disclosure. In practical application, two or more network devices and two or more terminal devices may be included. The communication system shown in FIG. 1 is exemplified by including a network device 101 and a terminal device 102.

It should be noted that the technical solutions of the embodiments of the present disclosure can be applied to various communication systems. For example: a long-term evolution (LTE) system, a 5th generation (5G) mobile communication system, a 5G new radio (NR) system, or other new mobile communication systems in the future.

The network device 101 in the embodiment of the present disclosure is an entity on a network side for transmitting or receiving signals. For example, the network device 101 may be an evolved NodeB (eNB), a transmission reception point (TRP), a next generation NodeB (gNB) in an NR system, a base station in other future mobile communication systems or an access node in a wireless fidelity (WiFi) system. The embodiments of the present disclosure do not limit the specific techniques and specific device forms used in the network device. The network device provided by the embodiments of the present disclosure may be composed of a central unit (CU) and a distributed unit (DU), in which the CU can also be called a control unit. With a structure of CU-DU, protocol layers of a network device, such as a base station, can be separated, and some functions of the protocol layers are centrally controlled by CU, while the remaining or all functions of the protocol layers are distributed in DU, and the DU is centrally controlled by CU.

The terminal device 102 in the embodiment of the present disclosure is an entity on a user side for receiving or transmitting signals, such as a mobile phone. A terminal device can also be referred to as a terminal, a user equipment (UE), a mobile station (MS), a mobile terminal (MT), etc. The terminal device can be a car with the communication function, a smart car, a mobile phone, a wearable device, a Pad, a computer with the wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. The embodiments of the present disclosure do not limit the specific techniques and specific device forms used in the terminal device.

In a process of resource block configuration in the above communication system, if a channel bandwidth used by the terminal device is determined, a maximum resource block number used by a terminal device is also fixed, and a maximum resource block number allocated by a network device for the terminal device is fixed. However, for different terminal devices using a same channel bandwidth, corresponding maximum transmission resource block capabilities of different terminal devices are different. The method of configuring resource blocks based on the channel bandwidth used by the terminal device may lead to low spectrum utilization.

In the embodiments of the present disclosure, a maximum number of transmission resource blocks of a terminal device is determined in combination with capability information about maximum transmission resource blocks reported by the terminal device, and resource block configuration is performed for the terminal device in combination with the determined maximum number of transmission resource blocks, so that resource allocation is realized in combination with the capability information of the maximum transmission resource blocks of the terminal device, network resources are reasonably utilized, and the spectrum utilization rate is improved.

It can be understood that the communication system described in the embodiments of the present disclosure is for more clearly explaining the technical solution of the embodiments of the present disclosure, and does not constitute a limitation on the technical solution provided by the embodiments of the present disclosure, and a person of ordinary skill in the art may know that, with the evolution of system architecture and the emergence of new business scenarios, the technical solution provided by the embodiment of the present disclosure is also applicable to similar technical problems.

The resource allocation method and apparatus thereof provided by the present disclosure are described in detail below in conjunction with the accompanying drawings.

Figure 2:
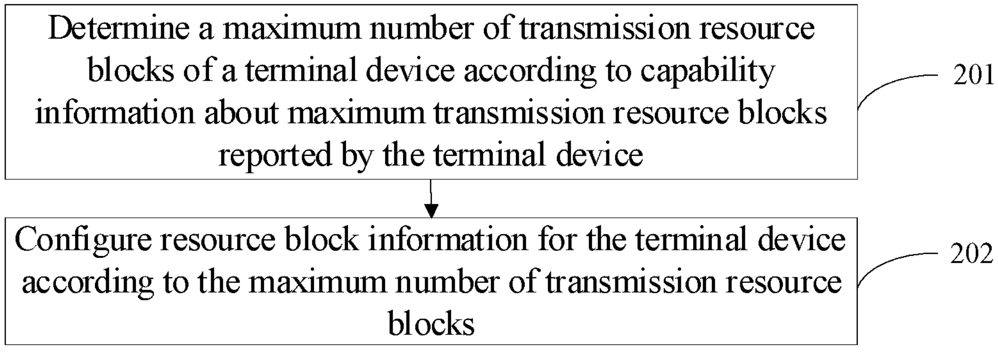
FIG. 2 is a flowchart of a resource allocation method according to an embodiment of the present disclosure.

FIG. 2 is a flowchart of a resource allocation method according to an embodiment of the present disclosure. The method is applied to the network device in the communication system shown in FIG. 1. As shown in FIG. 2, the method may include, but is not limited to, the following steps.

At step 201, a maximum number of transmission resource blocks of a terminal device is determined according to capability information about maximum transmission resource blocks reported by the terminal device.

In some embodiments, the capability information about the maximum transmission resource blocks reported by the terminal device via signaling is received, and the maximum number of transmission resource blocks of the terminal device is determined according to the capability information of the maximum transmission resource blocks.

At step 202, resource block information is configured for the terminal device according to the maximum number of transmission resource blocks.

In an embodiment of the present disclosure, the resource block information may include, but is not limited to, information such as a starting position of a resource block and/or resource size information.

According to the embodiment of the present disclosure, the maximum number of transmission resource blocks of the terminal device is determined in combination with the capability information about maximum transmission resource blocks reported by the terminal device, and the resource block configuration is performed for the terminal device in combination with the determined maximum number of transmission resource blocks, so that resource allocation is realized in combination with the capability information of the maximum transmission resource blocks of the terminal device, network resources are reasonably utilized, and the spectrum utilization rate is improved.

Figure 3:
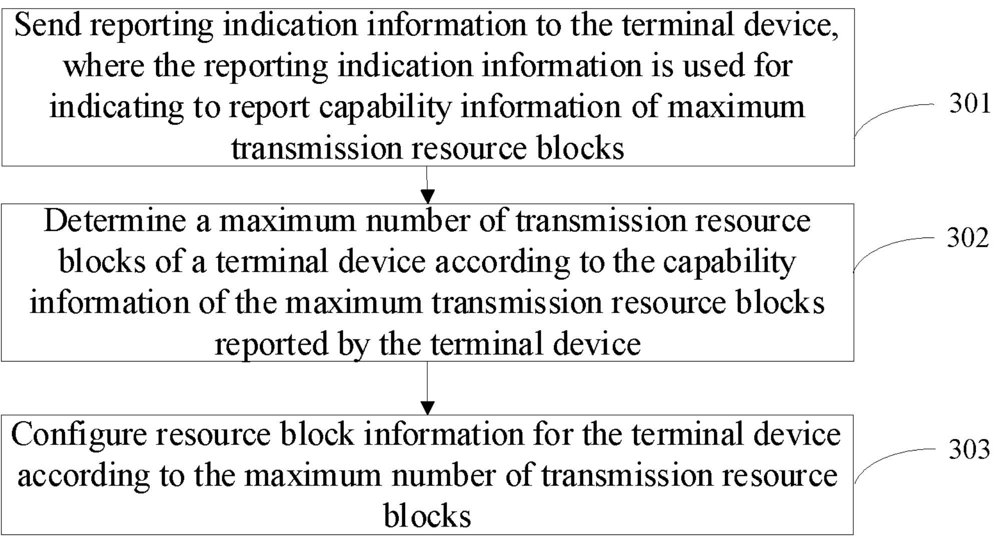
FIG. 3 is a flowchart of another resource allocation method according to an embodiment of the present disclosure.

FIG. 3 is a flowchart of another resource allocation method according to an embodiment of the present disclosure. The method is applied to the network device in the communication system shown in FIG. 1. As shown in FIG. 3, the method may include, but is not limited to, the following steps.

At step 301, reporting indication information is sent to the terminal device, where the reporting indication information is used for indicating to report capability information of maximum transmission resource blocks.

In some embodiments, the network device can send the reporting indication information for indicating to report the capability information of the maximum transmission resource blocks to the terminal device via first signaling, so that the terminal device can send the capability information of its own maximum transmission resource blocks according to the reporting indication information of the network device.

At step 302, a maximum number of transmission resource blocks of a terminal device is determined according to the capability information of the maximum transmission resource blocks reported by the terminal device.

In some embodiments, the terminal device may send the capability information that can represent its own maximum transmission resource blocks to the network device via second signaling. Correspondingly, the network device acquires the capability information of the maximum transmission resource blocks of the terminal device via the second signaling, and determines the maximum number of transmission resource blocks of the terminal device according to the capability information of the maximum transmission resource blocks of the terminal device.

At step 303, resource block information is configured for the terminal device according to the maximum number of transmission resource blocks.

In an embodiment of the present disclosure, the resource block information may include, but is not limited to, information such as a starting position of a resource block and/or resource size information.

In the embodiment of the present disclosure, the network device sends a reporting instruction to the terminal device to require the terminal device to report the capability of the maximum transmission resource blocks. The terminal device reports the capability of the maximum transmission resource blocks, and the base station performs resource block configuration for the terminal device according to the capability reported by the terminal device, thus realizing a reasonable allocation of resources in combination with the capability of the maximum transmission resource blocks of the terminal device, avoiding a waste of resources caused by resource allocation in a fixed way and improving a utilization rate of spectrum resources.

Figure 4:
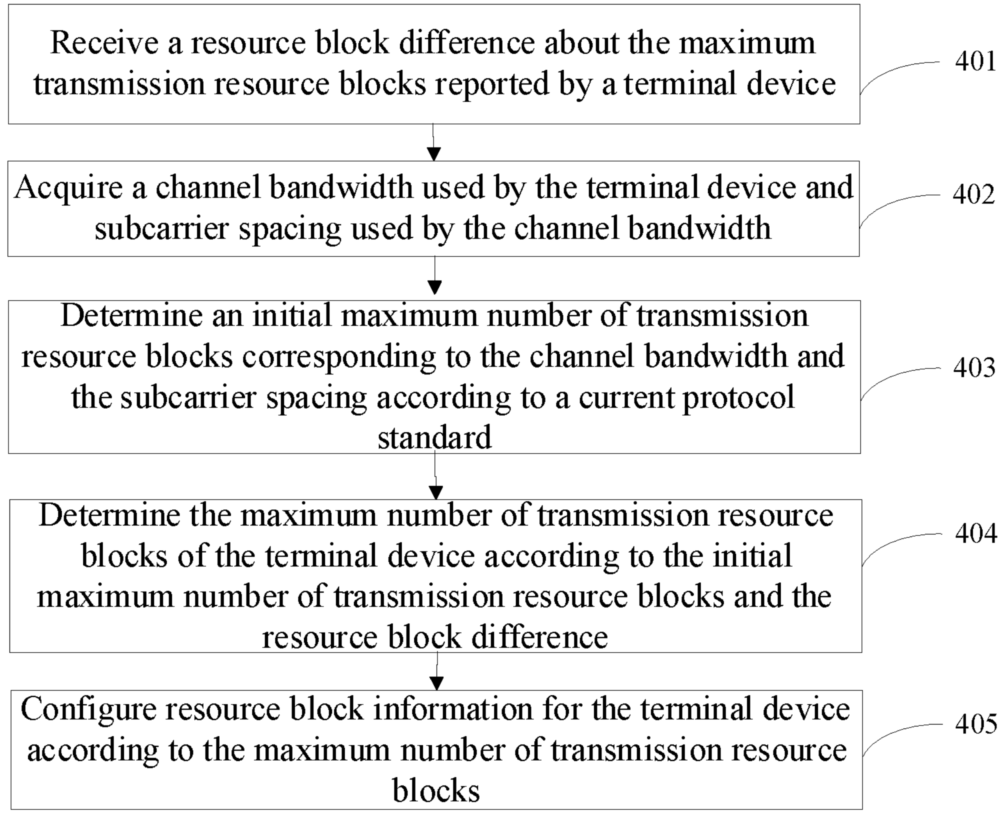
FIG. 4 is a flowchart of another resource allocation method according to an embodiment of the present disclosure.

FIG. 4 is a flowchart of another resource allocation method according to an embodiment of the present disclosure. The method is applied to the network device in the communication system shown in FIG. 1. It should be noted that in this embodiment, the capability of the maximum transmission resource blocks of the terminal device is represented by a resource block difference of the maximum transmission resource blocks. As shown in FIG. 4, the method may include, but is not limited to, the following steps.

At step 401, a resource block difference about the maximum transmission resource blocks reported by a terminal device is received.

The resource block difference can be one resource block, or two resource blocks, etc., and this embodiment does not specifically limit this.

At step 402, a channel bandwidth used by the terminal device and subcarrier spacing used by the channel bandwidth are acquired.

At step 403, an initial maximum number of transmission resource blocks corresponding to the channel bandwidth and the subcarrier spacing is determined according to a current protocol standard.

In some embodiments, the initial maximum number of transmission resource blocks corresponding to the channel bandwidth and subcarrier spacing can be acquired according to a correspondence among channel bandwidth, subcarrier spacing and maximum number of transmission resource blocks in the current protocol standard.

At step 404, the maximum number of transmission resource blocks of the terminal device is determined according to the initial maximum number of transmission resource blocks and the resource block difference.

For example, for a terminal device A, the base station determines that a channel bandwidth of terminal device A is 5 MHz and subcarrier spacing used is 15 KHz. Assuming that according to the current protocol standard, the initial maximum number of transmission resource blocks corresponding to the channel bandwidth and subcarrier spacing is 25. Assuming that the maximum transmission resource blocks of terminal device A is determined to have high capability according to a reported indication field, and a specified resource block difference is 1 resource block, at this time, based on the initial maximum number of transmission resource blocks and the resource block difference, it can be determined that the maximum number of transmission resource blocks of terminal device A is 26 resource blocks.

At step 405, resource block information is configured for the terminal device according to the maximum number of transmission resource blocks.

In an embodiment of the present disclosure, the resource block information may include, but is not limited to, information such as a starting position of a resource block and/or resource size information.

In the embodiment of the present disclosure, the network device sends a reporting instruction to the terminal device to require the terminal device to report the capability of the maximum transmission resource blocks. The terminal device reports the capability of the maximum transmission resource blocks, e.g., the resource block difference, and the base station performs resource block configuration for the terminal device according to the capability of the maximum transmission resource blocks reported by the terminal device, thus realizing resource allocation in combination with the capability of the maximum transmission resource blocks of the terminal device, avoiding a waste of spectrum resources caused by resource allocation in a fixed way and improving a utilization rate of spectrum resources.

Based on the above embodiments, there are various ways to trigger the terminal device to report the resource block difference of the maximum transmission resource blocks, and explanations are as follows.

In some embodiments, reporting indication information can be sent to the terminal device, and the reporting indication information may be used to indicate reporting the resource block difference of the maximum transmission resource blocks. Thus, the terminal device can upload the resource block difference of the maximum transmission resource blocks according to the indication information of the network device.

In other embodiments, the terminal device can determine a cycle time for reporting the resource block difference of the maximum transmission resource blocks according to a protocol standard it uses, and periodically report the resource block difference of the maximum transmission resource blocks according to the cycle time.

In other embodiments, the network device may further configure a cycle time for reporting to the terminal device, so that the terminal device can periodically report the resource block difference of the maximum transmission resource blocks according to the configured cycle time.

It should be noted that the ways to trigger the terminal device to report the resource block difference of the maximum transmission resource blocks include but are not limited to the above examples, and these embodiments do not specifically limit the way to trigger the terminal device to report the resource block difference of the maximum transmission resource blocks.

FIG. 5 is a flowchart of another resource allocation method according to an embodiment of the present disclosure. The method is applied to the network device in the communication system shown in FIG. 1. It should be noted that in this embodiment, the capability of the maximum transmission resource blocks of the terminal device is represented by an indication field for indicating whether a capability of the maximum transmission resource blocks is a high capability. As shown in FIG. 5, the method may include, but is not limited to, the following steps.

At step 501, an indication field reported by a terminal device is received, where the indication field is used for indicating whether the capability of the maximum transmission resource blocks is a high capability.

At step 502, in response to determining that the terminal device has the high capability according to an indication value of the indication field, the maximum number of transmission resource blocks of the terminal device is determined.

At step 503, resource block information is configured for the terminal device according to the maximum number of transmission resource blocks.

In an embodiment of the present disclosure, the resource block information may include, but is not limited to, information such as a starting position of a resource block and/or resource size information.

Based on the above embodiments, there are various ways to determine the maximum number of transmission resource blocks of the terminal device in response to determining that the terminal device has the high capability according to the indication value of the indication field, and explanations are as follows.

As an embodiment, a specified resource block difference is acquired in response to determining that the terminal device has the high capability according to the indication value of the indication field; a channel bandwidth used by the terminal device and subcarrier spacing used by the channel bandwidth are acquired; an initial maximum number of transmission resource blocks corresponding to the channel bandwidth and the subcarrier spacing according to a current protocol standard is determined; and the maximum number of transmission resource blocks of the terminal device is determined according to the initial maximum number of transmission resource blocks and the specified resource block difference. In some embodiments, the specified resource block difference may be a value such as 1 resource block, 2 resource blocks, 3 resource blocks, etc., which is not specifically limited in this embodiment.

For example, a network-side device is a base station, and the base station determines an initial maximum number of transmission resource blocks of the terminal device to be 25 resource blocks. Assuming that the terminal device has high capability regarding the maximum transmission resource blocks, and a specified resource block difference of 3 resource blocks is acquired. At this time, the initial maximum number of transmission resource blocks of the terminal device is added to the specified resource block difference to obtain the final maximum number of transmission resource blocks of the terminal device as 28 resource blocks. At this time, the base station can carry out a resource block resource allocation for the terminal device based on the 28 resource blocks.

As another embodiment, in response to determining that the terminal device has the high capability according to the indication value of the indication field, the maximum number of transmission resource blocks of the terminal device is determined according to a correspondence between the terminal device and the maximum transmission resource blocks.

As another embodiment, in response to determining that the terminal device has the high capability according to the indication value of the indication field, a specified resource block difference is acquired, the initial maximum number of transmission resource blocks of the terminal device is determined, and according to the resource block difference and the initial maximum number of transmission resource blocks, the maximum number of transmission resource blocks of the terminal device is determined.

In the embodiment of the present disclosure, the network device receives the indication field reported by the terminal device, acquires the specified resource block difference under the condition that the capability of the maximum transmission resource block of the terminal device is determined to be high according to the indication field, determines the initial maximum transmission resource block number of the terminal device in combination with the channel bandwidth and the subcarrier spacing used by the terminal device, determines the maximum transmission resource block number of the terminal device in combination with the specified resource block difference and the initial maximum transmission resource block number, and performs resource block configuration for the terminal device in combination with the determined maximum number of transmission resource blocks, thus realizing a resource allocation in combination with the capability of the maximum transmission resource blocks of the terminal device, avoiding a waste of resources caused by resource allocation in a fixed way and improving a utilization rate of spectrum resources.

Based on the above embodiments, there are various ways to trigger the terminal device to report whether the capacity of the maximum transmission resource block is high, and examples are as follows.

In an embodiment of the present disclosure, reporting indication information is sent to the terminal device, where the reporting indication information may be used for indicating to report whether the capability of the maximum transmission resource blocks is high. Therefore, the terminal device can determine whether the capability of its own maximum transmission resource blocks is high according to the reporting indication information sent by the network device.

In another embodiment of the present disclosure, the terminal device may determine, according to a current protocol standard, a cycle time of reporting an indication field which indicates whether the capability of maximum transmission resource blocks is a high capability, and periodically report the indication field which indicates whether the capability of maximum transmission resource blocks is a high capability according to the cycle time.

In another embodiment of the present disclosure, the network device may further send a cycle time for reporting to the terminal device, so that the terminal device can periodically report the indication field, which indicates whether the capability of maximum transmission resource blocks is a high capability according to the configured cycle time.

It should be noted that the ways to trigger the terminal device to report whether the capacity of the maximum transmission resource block is high include, but are not limited to, the above example, and this embodiment does not specifically limit the way to trigger the terminal device to report the capability information of the maximum transmission resource blocks to the network device.

FIG. 6 is a flowchart of another resource allocation method according to an embodiment of the present disclosure. The method is applied to the network device in the communication system shown in FIG. 1. It should be noted that in this embodiment, the capacity information of the maximum transmission resource blocks, including a maximum transmission resource block number, is used as an example. As shown in FIG. 6, the method may include, but is not limited to, the following steps.

At step 601, a maximum transmission resource block number reported by the terminal device is received.

At step 602, the maximum transmission resource block number reported by the terminal device is taken as the maximum number of transmission resource blocks of the terminal device.

At step 603, resource block information is configured for the terminal device according to the maximum number of transmission resource blocks.

In an embodiment of the present disclosure, the resource block information may include, but is not limited to, information such as a starting position of a resource block and/or resource size information.

In the embodiment of the present disclosure, the network device receives the maximum transmission resource block number on the terminal device, and directly regards this number as the maximum number of transmission resource blocks of the terminal device, and configures resource block information for the terminal device based on the maximum number of transmission resource blocks, thus realizing a resource allocation in combination with the capability of the maximum transmission resource blocks of the terminal device, avoiding a waste of resources caused by resource allocation in a fixed way and improving a utilization rate of spectrum resources.

Based on the above embodiments, there are various ways to trigger the terminal device to report the maximum transmission resource block number, and explanations are as follows.

In some embodiments, reporting indication information is sent to the terminal device, which can be used to indicate reporting the maximum transmission resource block number. Therefore, the terminal device can report the maximum transmission resource block number for itself according to the reporting indication information sent by the network device.

In other embodiments, the terminal device can determine a cycle time for reporting according to a current protocol standard, and periodically report the maximum transmission resource block number according to the cycle time.

In other embodiments, the network device may further send a cycle time for reporting to the terminal device, so that the terminal device can periodically report the maximum transmission resource block number according to the configured cycle time.

It should be noted that the ways to trigger the terminal device to report the maximum transmission resource block number to the network device include, but are not limited to, the above example, and this embodiment does not specifically limit the way to trigger the terminal device to report the maximum transmission resource block number to the network device.

Figure 7:
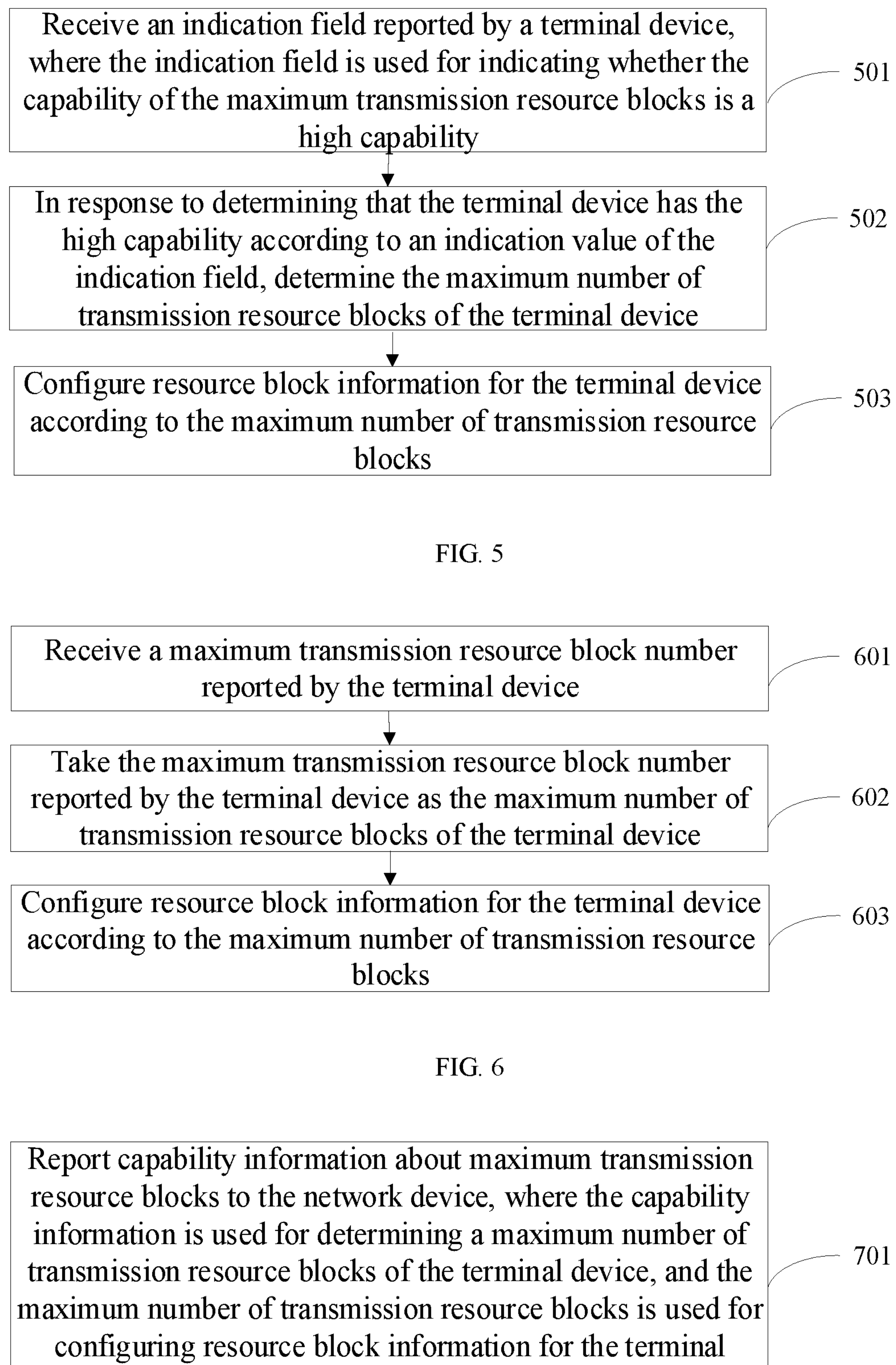
FIG. 7 is a flowchart of another resource allocation method according to an embodiment of the present disclosure.

FIG. 7 is a flowchart of another resource allocation method according to an embodiment of the present disclosure. The method is applied to a terminal device in the communication system shown in FIG. 1. As shown in FIG. 7, the method may include, but is not limited to, the following steps.

At step 701, capability information about maximum transmission resource blocks is reported to a network device, where the capability information is used for determining a maximum number of transmission resource blocks of the terminal device, and the maximum number of transmission resource blocks is used for configuring resource block information for the terminal device.

In some embodiments of the present disclosure, the capability information for maximum transmission resource blocks includes an indication field for whether a capability of the maximum transmission resource blocks is a high capability.

Correspondingly, after receiving the indication field, the network device can acquire a channel bandwidth used by the terminal device and subcarrier spacing used by the channel bandwidth, determine an initial maximum number of transmission resource blocks corresponding to the channel bandwidth and the subcarrier spacing according to a current protocol standard, in response to determining that the terminal device has the high capability according to an indication value of the indication field, acquire a specified resource block difference, and determine the maximum number of transmission resource blocks of the terminal device according to the resource block difference and the initial maximum number of transmission resource blocks. In other embodiments, the capability information includes a resource block difference, which is used to determine the maximum number of transmission resource blocks of the terminal device in combination with the initial number of maximum resource blocks corresponding to the channel bandwidth and the subcarrier spacing used by the terminal device.

An implementation process of determining the number of maximum resource blocks of the terminal device by the network device in combination with the resource block difference of the maximum transmission resource blocks uploaded by the terminal device, can be seen in the relevant part of the embodiments of the present disclosure, which is not specifically limited.

In other embodiments, the capability information of the maximum transmission resource blocks may include the maximum transmission resource block number, so that the network device can determine the maximum number of transmission resource blocks of the terminal device according to the maximum transmission resource block number reported by the terminal device.

In other embodiments, the capability information includes an indication field of whether a capability is a high capability. Correspondingly, after receiving the indication field, the network device, in the case where the capability of the terminal device is determined to be high capability according to an indication value of the indication field, may acquire a specified resource block difference and combine it with the channel bandwidth used by the terminal device to determine the maximum number of transmission resource blocks of the terminal device.

It should be noted that a specific process of determining the maximum number of transmission resource blocks of the terminal device by the network device can be found in the relevant part of the present disclosure, and will not be repeated here.

In the embodiment of the present disclosure, the terminal device reports the capability information about maximum transmission resource blocks to the network device, so that the network device can allocate the resource block according to the capability information about maximum transmission resource blocks reported by the terminal device, thus realizing the resource allocation, reasonably utilizing the network resources, and improving the spectrum utilization rate.

Based on the above embodiments, there are various ways to trigger the terminal device to report the capability information about maximum transmission resource blocks to the network device, and the examples are as follows.

In an embodiment of the present disclosure, reporting indication information is sent to a terminal device, and the reporting indication information is used for indicating to report the capability information. Therefore, the terminal device can report the capability information of its own maximum transmission resource blocks according to the reporting indication information sent by the network device.

In another embodiment of the present disclosure, the terminal device may determine a cycle time for reporting the capability information of the maximum transmission resource blocks according to a current protocol standard, and periodically report the capability information of the maximum transmission resource blocks according to the cycle time.

In another embodiment of the present disclosure, the network device can further send a cycle time for reporting to the terminal device, so that the terminal device can periodically report the capability information of the maximum transmission resource blocks according to the configured cycle time.

It should be noted that the ways to trigger the terminal device to report the capability information of the maximum transmission resource blocks to the network device include, but are not limited to, the above examples, and this embodiment does not specifically limit the way to trigger the terminal device to report the capability information of the maximum transmission resource blocks to the network device.

Figure 8:
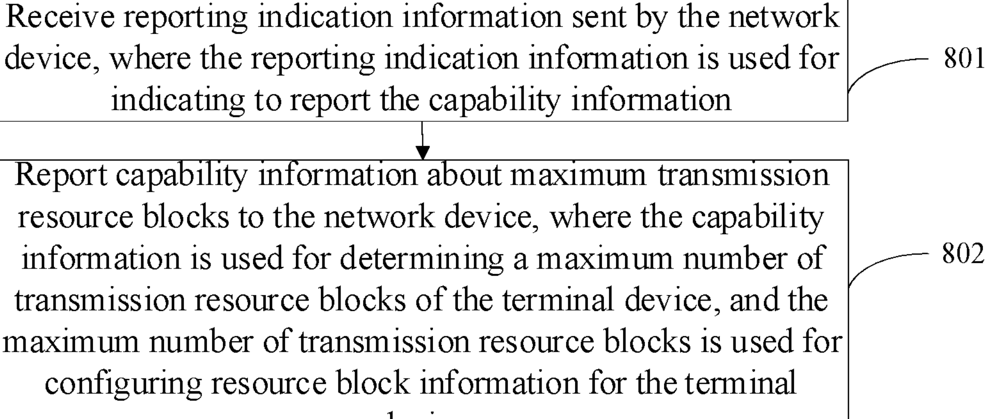
FIG. 8 is a flowchart of another resource allocation method according to an embodiment of the present disclosure.

FIG. 8 is a flowchart of another resource allocation method according to an embodiment of the present disclosure. The method is applied to a terminal device in the communication system shown in FIG. 1. As shown in FIG. 8, the method may include, but is not limited to, the following steps.

At step 801, reporting indication information sent by the network device is received, where the reporting indication information is used for indicating to report the capability information.

At step 802, capability information about maximum transmission resource blocks is reported to the network device, where the capability information is used for determining a maximum number of transmission resource blocks of the terminal device, and the maximum number of transmission resource blocks is used for configuring resource block information for the terminal device.

In the embodiment of the present disclosure, the terminal device receives indication information sent by the network device to report the capability of the maximum transmission resource blocks, the terminal device reports the capability of the maximum transmission resource blocks according to the indication information, the base station carries out a resource block configuration for the terminal device according to the reported capability of the terminal device, thus realizing a resource allocation in combination with the capability of the maximum transmission resource blocks of the terminal device, avoiding a waste of resources caused by resource allocation in a fixed way and improving a utilization rate of spectrum resources.

In the above embodiments provided by the present disclosure, the methods provided by the embodiments of the present disclosure are introduced from the perspectives of network device and terminal device, respectively. In order to realize the functions in the method provided by the embodiments of the present disclosure, the network device and the terminal device may include hardware structures and software modules, and the functions are realized in the form of hardware structures, software modules, or hardware structures plus software modules. One of the functions can be implemented in a hardware structure, a software module, or a combination of hardware structure and software module.

Figure 9:
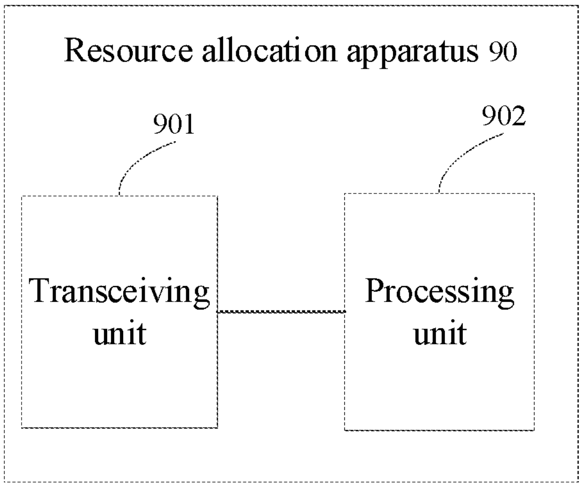
FIG. 9 is a schematic structural diagram of a resource allocation apparatus according to an embodiment of the present disclosure.

Referring to FIG. 9, FIG. 9 is a schematic structural diagram of a resource allocation apparatus 90 according to an embodiment of the present disclosure. The resource allocation apparatus 90 shown in FIG. 9 may include a transceiving unit 901 and a processing unit 902. The transceiving unit 901 may include a sending unit and/or a receiving unit, where the sending unit is configured to realize a sending function and the receiving unit is configured to realize a receiving function, and the transceiving unit 901 may realize a sending function and/or a receiving function.

The resource allocation apparatus 90 may be a network device, an apparatus within a network device, or an apparatus that can be matched and used with a network device. Or, the resource allocation apparatus 90 may be a terminal device, an apparatus within a terminal device, or an apparatus that can be matched and used with a terminal device.

The resource allocation apparatus 90 is a network device, and the processing unit 902 is configured to determine a maximum number of transmission resource blocks of a terminal device according to capability information about maximum transmission resource blocks reported by the terminal device; and configure resource block information for the terminal device according to the maximum number of transmission resource blocks.

In an implementation of the present disclosure, the transceiving unit 901 is configured to send reporting indication information to the terminal device, where the reporting indication information is used for indicating to report the capability information.

In a possible implementation of the present disclosure, the capability information includes a resource block difference, and the processing unit 902 is specifically configured to: acquire a channel bandwidth used by the terminal device and subcarrier spacing used by the channel bandwidth; determine an initial maximum number of transmission resource blocks corresponding to the channel bandwidth and the subcarrier spacing according to a current protocol standard; and determine the maximum number of transmission resource blocks of the terminal device according to the initial maximum number of transmission resource blocks and the resource block difference.

In a possible implementation of the present disclosure, the capability information includes an indication field of whether a capability is a high capability, and the processing unit 902 is specifically configured to: determine the maximum number of transmission resource blocks of the terminal device in response to determining that the terminal device has the high capability according to an indication value of the indication field.

In an implementation of the present disclosure, the processing unit 902 is specifically configured to: acquire a specified resource block difference in response to determining that the terminal device has the high capability according to the indication value of the indication field; acquire a channel bandwidth used by the terminal device and subcarrier spacing used by the channel bandwidth; determine an initial maximum number of transmission resource blocks corresponding to the channel bandwidth and the subcarrier spacing according to a current protocol standard; and determine the maximum number of transmission resource blocks of the terminal device according to the initial maximum number of transmission resource blocks and the resource block difference. In a possible implementation of the present disclosure, the processing unit 902 is specifically configured to: take a number carried in the capability information as the maximum number of transmission resource blocks of the terminal device.

In a possible implementation of the present disclosure, the resource block information includes a starting position of a resource block and/or resource size information.

The resource allocation apparatus 90 is a terminal device, and a transceiving unit 901 is configured to report capability information about maximum transmission resource blocks to a network device, where the capability information is used for determining a maximum number of transmission resource blocks of the terminal device, and the maximum number of transmission resource blocks is used for configuring resource block information for the terminal device.

In a possible implementation, the transceiving unit 901 is further configured to: receive reporting indication information sent by the network device, where the reporting indication information is used for indicating to report the capability information.

In an implementation, the capability information includes a resource block difference, the resource block difference is used for determining the maximum number of transmission resource blocks of the terminal device in conjunction with an initial maximum number of transmission resource blocks corresponding to subcarrier spacing of a channel bandwidth used by the terminal device.

In a possible implementation, the capability information includes an indication field of whether a capability is a high capability.

In an implementation, where the capability information includes a number.

Figure 10:
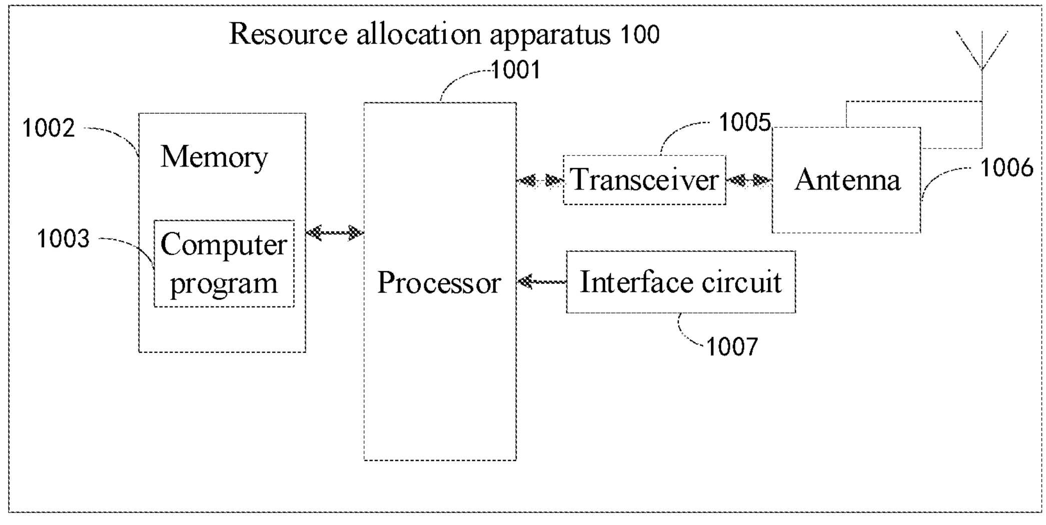
FIG. 10 is a schematic structural diagram of another resource allocation apparatus according to an embodiment of the present disclosure.

Referring to FIG. 10, FIG. 10 is a schematic structural diagram of another resource allocation apparatus according to an embodiment of the present disclosure. A resource allocation apparatus 100 may be a network device, a terminal device, a chip, a chip system, or a processor that supports a network device to realize the method, or a chip, a chip system, or a processor that supports a terminal device to realize the method. The apparatus can be configured to realize the method described in the method embodiment. Please refer to the description in the method embodiment for details.

The resource allocation apparatus 100 may include one or more processors 1001. The processor 1001 may be a general-purpose processor or a specialized processor, etc. Such as a baseband processor or a central processor. The baseband processor can be configured to process communication protocols and communication data, and the central processor can be configured to control resource allocation apparatuses (such as base stations, baseband chips, terminal devices, terminal device chips, DU or CU, etc.), execute computer programs, and process data of computer programs.

In some examples, the resource allocation apparatus 100 may further include one or more memories 1002, on which a computer program 1003 may be stored, and the processor 1001 may execute the computer program 1003 to enable the resource allocation apparatus 100 to execute the method described in the method embodiments. The computer program 1003 may be solidified in the processor 1001, in which case the processor 1001 may be implemented by hardware.

In some examples, data may further be stored in the memory 1002. The resource allocation apparatus 100 and the memory 1002 may be set separately or integrated together.

In some examples, the resource allocation apparatus 100 may further include a transceiver 1005 and an antenna 1006. The transceiver 1005 can be called a transceiving unit, a transceiving machine, a transceiving circuit, etc., and is configured to realize transceiving functions. The transceiver 1005 may include a receiver and a transmitter, and the receiver may be called a receiving machine or a receiving circuit, etc., for realizing receiving functions. The transmitter can be called a transmitting machine or a transmitting circuit, etc., and is configured to realize transmitting functions.

In some examples, the resource allocation apparatus 100 may further include one or more interface circuits 1007. The interface circuit 1007 is configured to receive code instructions and transmit them to the processor 1001. The processor 1001 executes code instructions to cause the resource allocation apparatus 100 to perform the method described in the method embodiments.

The resource allocation apparatus 100 is a network device: the processor 1001 is configured to perform steps 201 to step 202 in FIG. 2; steps 301 to step 303 in FIG. 3; steps 401 to step 405 in FIG. 4; steps 501 to step 503 in FIG. 5; and steps 601 to step 603 in FIG. 6.

The resource allocation apparatus 100 is a terminal device and the transceiver 1005 is configured to perform step 701 in FIG. 7; steps 801 through 802 in FIG. 8.

In one implementation, the processor 1001 may include a transceiver for receiving and transmitting functions. For example, the transceiver can be a transceiving circuit, or an interface, or an interface circuit. The transceiving circuit, interface or interface circuit for receiving and transmitting functions can be separated or integrated. The transceiving circuit, interface or interface circuit can be configured to read and write codes/data, or the transceiver circuit, interface or interface circuit can be configured to transmit or transfer a signal.

In an implementation, the resource allocation apparatus 100 may include a circuit, and the circuit may realize the function of sending, receiving or communicating in the method embodiments. The processor and transceiver described in the present disclosure can be implemented on an integrated circuit (IC), an analog IC, a radio frequency integrated circuit (RFIC), a mixed-signal IC, an application-specific integrated circuit (ASIC), a printed circuit board (PCB), an electronic device, and the like. The processor and transceiver can also be manufactured by various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS(BiCMOS), silicon germanium (SiGe), gallium arsenide (GaAs), etc.

The resource allocation apparatus described in the embodiments may be a network device or a terminal device, but the scope of the resource allocation apparatus described in the present disclosure is not limited thereto, and the structure of the resource allocation apparatus may not be limited by FIG. 9. The resource allocation apparatus may be a stand-alone device or may be a part of a larger device. For example, the resource allocation apparatus may be:

(1) A stand-alone integrated circuit IC, or a chip, or a chip system or subsystem;

(2) A collection of ICs having one or more ICs, e.g., the collection of ICs may also include storage components for storing data, computer programs;

(3) An ASIC, such as a modem;

(4) A module that can be embedded in other devices;

(5) A receiver, a terminal device, an intelligent terminal device, a cellular phone, a wireless device, a handheld device, a mobile unit, an in-vehicle device, a network device, a cloud device, an artificial intelligence device, and so on;

(6) Others, etc.

Figure 11:
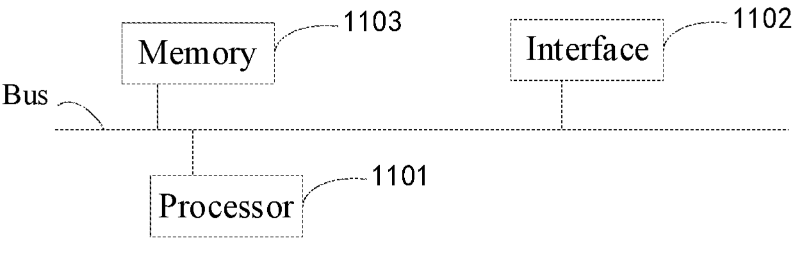
FIG. 11 is a schematic structural diagram of a chip according to an embodiment of the present disclosure.

For the case where the resource allocation apparatus may be a chip or a chip system, please refer to a structural schematic diagram of a chip shown in FIG. 11. The chip shown in FIG. 11 includes a processor 1101 and an interface 1102. The number of processors 1101 may be one or more, and the number of interfaces 1102 may be more than one.

For the case where the chip is configured to realize the functions of the network device in the embodiments of the present disclosure:

the interface 1102 is configured to transmit code instructions to the processor; and the processor 1101 is configured to execute code instructions to execute the methods shown in FIGS. 2 to 6.

For the case where the chip is configured to realize the function of the terminal device in the embodiments of the present disclosure:

the interface 1102 is configured to transmit code instructions to the processor; and the processor 1101 is configured to execute code instructions to execute the methods shown in FIGS. 7 to 8.

In some examples, the chip further includes a memory 1103 for storing necessary computer programs and data.

Those skilled in the art can also understand that various illustrative logical block and step listed in the embodiments of the present disclosure can be implemented by electronic hardware, computer software, or a combination of both. Whether this function is realized by hardware or software depends on the specific application and the design requirements of the whole system. Those skilled in the art can use various methods to realize the functions for each specific application, but this realization should not be understood as beyond the protection scope of the embodiments of the present disclosure.

An embodiment of the present disclosure further provides a communication system including a resource allocation apparatus as a terminal device and a resource allocation apparatus as a network device in the preceding embodiment of FIG. 9, or, the system includes a resource allocation apparatus as a terminal device and a resource allocation apparatus as a network device in the preceding embodiment of FIG. 10.

The present disclosure further provides a computer-readable storage medium, which, when executed by a computer, realizes the functions of any of the method embodiments.

The present disclosure further provides a computer program product which, when executed by a computer, realizes the functions of any of the method embodiments.

Embodiments of the present disclosure provide resource allocation methods and apparatuses thereof, which can be applied in a scenario of communication between a terminal device and a network device in a cellular mobile communication technology, determining a maximum number of transmission resource blocks of a terminal device in combination with capability information about maximum transmission resource blocks reported by the terminal device, and configuring resource block for the terminal device in combination with the determined maximum number of transmission resource blocks, so that resource allocation is realized in combination with the capability information of the maximum transmission resource blocks of the terminal device, network resources are reasonably utilized, and the spectrum utilization rate is improved.

In a first aspect, an embodiment of the present disclosure provides a resource allocation method, which is performed by network device, and the method includes: determining a maximum number of transmission resource blocks of a terminal device according to capability information about maximum transmission resource blocks reported by the terminal device; and configuring resource block information for the terminal device according to the maximum number of transmission resource blocks.

In this technical solution, the maximum number of transmission resource blocks of the terminal device is determined in combination with the capability information about maximum transmission resource blocks reported by the terminal device, and the resource block configuration is performed for the terminal device in combination with the determined maximum number of transmission resource blocks, so that resource allocation is realized in combination with the capability information of the maximum transmission resource blocks of the terminal device, network resources are reasonably utilized, and the spectrum utilization rate is improved.

In an implementation, the method further includes: sending reporting indication information to the terminal device, where the reporting indication information is used for indicating to report the capability information.

In an implementation, the capability information includes a resource block difference, and determining the maximum number of transmission resource blocks of the terminal device according to the capability information about the maximum transmission resource block reported by the terminal device includes: acquiring a channel bandwidth used by the terminal device and subcarrier spacing used by the channel bandwidth; determining an initial maximum number of transmission resource blocks corresponding to the channel bandwidth and the subcarrier spacing according to a current protocol standard; and determining the maximum number of transmission resource blocks of the terminal device according to the initial maximum number of transmission resource blocks and the resource block difference.

In an implementation, the capability information includes an indication field of whether a capability is a high capability, and determining the maximum number of transmission resource blocks of the terminal device according to the capability information about the maximum transmission resource block reported by the terminal device includes: determining the maximum number of transmission resource blocks of the terminal device in response to determining that the terminal device has the high capability according to an indication value of the indication field.

In an implementation, determining the maximum number of transmission resource blocks of the terminal device in response to determining that the terminal device has the high capability according to the indication value of the indication field includes: acquiring a specified resource block difference in response to determining that the terminal device has the high capability according to the indication value of the indication field; acquiring a channel bandwidth used by the terminal device and subcarrier spacing used by the channel bandwidth; determining an initial maximum number of transmission resource blocks corresponding to the channel bandwidth and the subcarrier spacing according to a current protocol standard; and determining the maximum number of transmission resource blocks of the terminal device according to the initial maximum number of transmission resource blocks and the resource block difference.

In an implementation, determining the maximum number of transmission resource blocks of the terminal device according to the capability information about the maximum transmission resource block reported by the terminal device includes: taking a number carried in the capability information as the maximum number of transmission resource blocks of the terminal device.

In an implementation, the resource block information includes a starting position of a resource block and/or resource size information.

In a second aspect, an embodiment of the present disclosure provides another resource allocation method, which is performed by a terminal device in a designated area, and the method includes: reporting capability information about maximum transmission resource blocks to a network device, where the capability information is used for determining a maximum number of transmission resource blocks of the terminal device, and the maximum number of transmission resource blocks is used for configuring resource block information for the terminal device.

In this technical solution, the terminal device reports the capability information about maximum transmission resource blocks to the network device, so that the network device can allocate the resource block according to the capability information about maximum transmission resource blocks reported by the terminal device, thus realizing the resource allocation, reasonably utilizing the network resources and improving the spectrum utilization rate.

In an implementation, the method further includes: receiving reporting indication information sent by the network device, where the reporting indication information is used for indicating to report the capability information.

In an implementation, the capability information includes a resource block difference, the resource block difference is used for determining the maximum number of transmission resource blocks of the terminal device in conjunction with an initial maximum number of transmission resource blocks corresponding to subcarrier spacing of a channel bandwidth used by the terminal device.

In an implementation, the capability information includes an indication field of whether a capability is a high capability.

In an implementation, the capability information includes a number.

In a third aspect, an embodiment of the present disclosure provides a resource allocation apparatus having some or all of functions of a network device for realizing the method described in the first aspect, such that the functions of the resource allocation apparatus may have the functions in some or all embodiments of the present disclosure, or may have the functions for implementing any of the embodiments of the present disclosure alone. The functions can be realized by hardware, or by hardware executing corresponding software. The hardware or software includes one or more units or modules corresponding to the above functions.

In a fourth aspect, an embodiment of the present disclosure provides another resource allocation apparatus having some or all of functions of a terminal device for realizing the method described in the second aspect, such that the functions of the resource allocation apparatus may have the functions in some or all embodiments of the present disclosure, or may have the functions for implementing any of the embodiments of the present disclosure alone. The functions can be realized by hardware, or by hardware executing corresponding software. The hardware or software includes one or more units or modules corresponding to the above functions.

In a fifth aspect, an embodiment of the present disclosure provides a resource allocation apparatus, which includes a processor, and when the processor calls a computer program in a memory, the method described in the first aspect is executed.

In a sixth aspect, an embodiment of the present disclosure provides a resource allocation apparatus, which includes a processor, and when the processor calls a computer program in a memory, the method described in the second aspect is executed.

In a seventh aspect, an embodiment of the present disclosure provides a resource allocation apparatus, which includes a processor and a memory, where a computer program is stored in the memory, and when the computer program is executed by the processor, the method described in the first aspect is executed.

In an eighth aspect, an embodiment of the present disclosure provides a resource allocation apparatus, which includes a processor and a memory, where a computer program is stored in the memory, and when the computer program is executed by the processor, the method described in the second aspect is executed.

In a ninth aspect, an embodiment of the present disclosure provides a resource allocation apparatus, which includes a processor and an interface circuit, where the interface circuit is configured to receive code instructions and transmit the code instructions to the processor, and the processor is configured to run the code instructions to enable the apparatus to execute the method described in the first aspect.

In a tenth aspect, an embodiment of the present disclosure provides a resource allocation apparatus, which includes a processor and an interface circuit, where the interface circuit is configured to receive code instructions and transmit the code instructions to the processor, and the processor is configured to run the code instructions to enable the apparatus to execute the method described in the second aspect.

In an eleventh aspect, an embodiment of the present disclosure provides a communication system, which includes the resource allocation apparatus of the third aspect and the resource allocation apparatus of the fourth aspect, or the system includes the resource allocation apparatus of the fifth aspect and the resource allocation apparatus of the sixth aspect, or the system includes the resource allocation apparatus of the seventh aspect and the resource allocation apparatus of the eighth aspect, or the system includes the resource allocation apparatus of the ninth aspect and the resource allocation apparatus of the tenth aspect.

In a twelfth aspect, an embodiment of the present disclosure provides a computer-readable storage medium for storing instructions for the network device, and when the instructions are executed, causing the terminal device to execute the method described in the first aspect.

In a thirteenth aspect, an embodiment of the present disclosure provides a computer-readable storage medium for storing instructions for the network device, and when the instructions are executed, causing the terminal device to execute the method described in the second aspect.

In a fourteenth aspect, the present disclosure further provides a computer program product including a computer program, which, when run on a computer, causes the computer to perform the method described in the first aspect.

In a fifteenth aspect, the present disclosure further provides a computer program product including a computer program, which, when run on a computer, causes the computer to perform the method described in the second aspect.

In a sixteenth aspect, the present disclosure provides a chip system, which includes at least one processor and an interface, and is configured to support a network device to realize the functions related to the first aspect, for example, determining or processing at least one of data or information related to the above method. In a possible design, the chip system further includes a memory, and the memory is configured to store computer programs and data necessary for the network device. The chip system can be composed of chips and can also include chips and other discrete devices.

In a seventeenth aspect, the present disclosure provides a chip system, which includes at least one processor and an interface, and is configured to support a terminal device to realize the functions related to the second aspect, for example, determining or processing at least one of data or information related to the above method. In a possible design, the chip system further includes a memory, and the memory is configured to store computer programs and data necessary for the terminal device. The chip system can be composed of chips and can also include chips and other discrete devices.

In an eighteenth aspect, the present disclosure provides a computer program which, when run on a computer, causes the computer to perform the method described in the first aspect.

In a nineteenth aspect, the present disclosure provides a computer program which, when run on a computer, causes the computer to perform the method described in the second aspect.

In the above embodiments, it can be realized in whole or in part by software, hardware, firmware, or any combination thereof. When implemented in software, it can be fully or partially implemented in the form of a computer program product. The computer program product includes one or more computer programs. When the computer program is loaded and executed on a computer, a process or function according to an embodiment of the present disclosure is generated in whole or in part. A computer may be a general-purpose computer, a specialized computer, a computer network, or other programmable apparatus. A computer program can be stored in a computer-readable storage medium or transmitted from one computer-readable storage medium to another. For example, a computer program can be transmitted from a website, computer, server, or data center to another website, computer, server, or data center by wired (such as coaxial cable, optical fiber, digital subscriber line (DSL)) or wireless (such as infrared, wireless, microwave, etc.). A computer-readable storage medium may be any available medium that a computer can access, or a data storage device such as a server, data center, etc., that contains one or more available media integrated. The available medium may be a magnetic medium (e.g., a floppy disk, a hard disk, a tape), an optical medium (e.g., a high-density digital video discs (DVD)), or a semiconductor medium (e.g., a solid state disk (SSD)), etc.

It can be understood by those skilled in the art that first, second, and other numerical numbers involved in the present disclosure are only for the convenience of description, and are not used to limit the scope of the embodiments of the present disclosure, but also indicate the order.

The at least one in the present disclosure may also be described as one or more, and the plurality may be two, three, four, or more, without limitation of the present disclosure. In the embodiments of the present disclosure, for a technical feature, the technical features described in "first", "second", "third", "A", "B", "C", and "D" are distinguished, and there is no order or order of magnitude between the technical features described in "first", "second", "third", "A", "B", "C", and "D".

The correspondences shown in the tables in the present disclosure may be configured or may be predefined. The values of the information in each table are only examples, and can be configured as other values, and the present disclosure is not limited. When configuring the correspondence between the information and each parameter, it is not necessary to configure all the correspondences illustrated in each table. For example, in a table in the present disclosure, corresponding relationships shown by some rows may not be configured. For example, appropriate deformation adjustments can be made based on the above table, such as splitting, merging, etc. The names of the parameters indicated by the headings in the above tables can also be other names that can be understood by the communication apparatus, and the values or representations of the parameters can also be other values or representations that can be understood by the communication apparatus. Other data structures can also be used when the above tables are implemented, such as arrays, queues, containers, stacks, linear tables, pointers, linked lists, trees, graphs, structures, classes, heaps, hash tables, etc.

The predefined in the present disclosure can be understood as definition, pre-definition, storage, pre-storage, pre-negotiation, pre-configuration, curing, or pre-firing.

One of ordinary skill in the art can realize that the units and algorithm steps of various examples described in connection with the embodiments disclosed herein can be implemented in electronic hardware, or a combination of computer software and electronic hardware. Whether these functions are implemented in hardware or software depends on the specific application and design constraints of the technical solution. Skilled people can use different methods to realize the described functions for each specific application, but such implementation should not be considered beyond the scope of the present disclosure.

It can be clearly understood by those skilled in the art that for the convenience and conciseness of description, the specific working processes of the systems, apparatuses, and units described above can refer to the corresponding processes in the method embodiments, and will not be repeated here.

The above is only the specific implementation method disclosed in the present disclosure, but the protection scope of the present disclosure is not limited thereto. Changes or substitutions that can be easily thought by any person familiar with the technical field within the technical scope disclosed in the present disclosure should be included in the protection scope of the present disclosure. Therefore, the protection scope of the present disclosure should be subject to the protection scope of the claims.

The invention claimed is:

1. A resource allocation method, performed by a network device, comprising:

determining a maximum number of transmission resource blocks of a terminal device corresponding to a channel bandwidth according to capability information reported by the terminal device, wherein the capability information indicates a capability of the terminal device about the maximum transmission resource blocks corresponding to the channel bandwidth; and configuring resource block information for the terminal device in the channel bandwidth according to the maximum number of transmission resource blocks;

wherein the capability information comprises a resource block difference, and determining the maximum number of transmission resource blocks of the terminal device corresponding to the channel bandwidth according to the capability information reported by the terminal device comprises:

acquiring the channel bandwidth used by the terminal device and a subcarrier spacing used by the channel bandwidth;

determining an initial maximum number of transmission resource blocks corresponding to the channel bandwidth and the subcarrier spacing; and determining the maximum number of transmission resource blocks of the terminal device according to the initial maximum number of transmission resource blocks and the resource block difference.

2. The method according to claim 1, further comprising:

sending reporting indication information to the terminal device, wherein the reporting indication information is used for indicating the terminal device to report the capability information.

3. The method according to claim 1, wherein the resource block information comprises at least one of a starting position of a resource block or resource size information.

4. A resource allocation method, performed by a terminal device, comprising:

reporting capability information to a network device, wherein the capability information is used for determining a maximum number of transmission resource blocks of the terminal device, and the capability information indicates a capability of the terminal device about the maximum transmission resource blocks corresponding to a channel bandwidth, and the maximum number of transmission resource blocks is used for configuring resource block information for the terminal device in the channel bandwidth;

wherein the capability information comprises a resource block difference, the resource block difference is used for determining the maximum number of transmission resource blocks of the terminal device in conjunction with an initial maximum number of transmission resource blocks corresponding to the channel bandwidth used by the terminal device and a subcarrier spacing used by the channel bandwidth.

5. The method according to claim 4, further comprising:

receiving reporting indication information sent by the network device, wherein the reporting indication information is used for indicating the terminal device to report the capability information.

6. A resource allocation apparatus, wherein the apparatus comprises a processor and a memory, wherein a computer program is stored in the memory, and when the computer program is executed by the processor, the processor is configured to perform the resource allocation method of claim 1.

7. A resource allocation apparatus, wherein the apparatus comprises a processor and a memory, wherein a computer program is stored in the memory, and when the computer program is executed by the processor, the method according to claim 4 is executed.

8. A non-transitory computer-readable storage medium, configured to store instructions, when the instructions are executed, the method according to claim 1 is implemented.

9. A non-transitory computer-readable storage medium, configured to store instructions, when the instructions are executed, the method according to claim 4 is implemented.

10. The apparatus according to claim 6, wherein the processor is further configured to:

send reporting indication information to the terminal device, wherein the reporting indication information is used for indicating the terminal device to report the capability information.

11. A resource allocation method, performed by a network device, comprising:

determining a maximum number of transmission resource blocks of a terminal device corresponding to a channel bandwidth according to capability information reported by the terminal device, wherein the capability information indicates a capability of the terminal device about the maximum transmission resource blocks corresponding to the channel bandwidth; and configuring resource block information for the terminal device in the channel bandwidth according to the maximum number of transmission resource blocks;

wherein the capability information comprises an indication field of whether a capability is a high capability, and determining the maximum number of transmission resource blocks of the terminal device corresponding to the channel bandwidth according to the capability information reported by the terminal device comprises:

acquiring a specified resource block difference in response to determining that the terminal device has the high capability according to an indication value of the indication field;

acquiring the channel bandwidth used by the terminal device and a subcarrier spacing used by the channel bandwidth;

determining an initial maximum number of transmission resource blocks corresponding to the channel bandwidth and the subcarrier spacing; and determining the maximum number of transmission resource blocks of the terminal device according to the initial maximum number of transmission resource blocks and the resource block difference.

12. The method according to claim 11, further comprising:

sending reporting indication information to the terminal device, wherein the reporting indication information is used for indicating the terminal device to report the capability information.

13. The method according to claim 11, wherein the resource block information comprises at least one of a starting position of a resource block or resource size information.

* * * * *